US012782253B2

(12) United States Patent
Kim et al.

(10) Patent No.: US 12,782,253 B2
(45) Date of Patent: Nov. 3, 2026

(54) CYLINDRICAL BATTERY CELL IMPACT TEST METHODS AND CYLINDRICAL BATTERY CELL IMPACT TEST APPARATUSES THEREFOR

(71) Applicant: LG ENERGY SOLUTION, LTD., Seoul (KR)

(72) Inventors: Min Geun Kim, Daejeon (KR); Young Ji Tae, Daejeon (KR); Hyoung Kwon Kim, Daejeon (KR); Kwi Sub Yun, Daejeon (KR); Kwang Soo Lee, Daejeon (KR); Ji Woo Jeong, Daejeon (KR); Jin Seul Byun, Daejeon (KR); Seong Hyun Kim, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 220 days.

(21) Appl. No.: 18/845,411

(22) PCT Filed: Nov. 1, 2023

(86) PCT No.: PCT/KR2023/017225
§ 371 (c)(1),
(2) Date: Sep. 9, 2024

(87) PCT Pub. No.: WO2024/096557
PCT Pub. Date: May 10, 2024

(65) Prior Publication Data

US 2025/0189420 A1 Jun. 12, 2025

(30) Foreign Application Priority Data

Nov. 1, 2022 (KR) ........................ 10-2022-0144009

(51) Int. Cl.
*G01N 3/303* (2006.01)

(52) U.S. Cl.
CPC .................................... *G01N 3/303* (2013.01)

(58) Field of Classification Search
CPC .................................. G01N 3/30; G01N 3/48
USPC ............................................. 73/12.06, 12.13
See application file for complete search history.

(56) References Cited

U.S. PATENT DOCUMENTS

2008/0282767 A1* 11/2008 Ido ......................... G01N 3/303 73/11.01
2018/0095020 A1 4/2018 Noh et al.
2019/0302187 A1* 10/2019 Jung ..................... H01M 10/44

FOREIGN PATENT DOCUMENTS

CN 103674460 A * 3/2014
CN 104132794 A * 11/2014
CN 206269987 U 6/2017
CN 209181991 U * 7/2019
CN 107340178 B * 12/2019 ............... G01N 3/02

(Continued)

OTHER PUBLICATIONS

Machine translation of CN 103674460 (Year: 2014).*

(Continued)

*Primary Examiner* — Nathaniel J Kolb
(74) *Attorney, Agent, or Firm* — Bryan Cave Leighton Paisner LLP

(57) ABSTRACT

Provided are cylindrical battery cell impact test methods including disposing a cylindrical battery cell on a base; disposing a magnetic portion of a rod above a surface of the cylindrical battery cell; and dropping a weight toward the rod, and cylindrical battery cell impact test apparatuses therefor.

16 Claims, 7 Drawing Sheets

(56) References Cited

FOREIGN PATENT DOCUMENTS

| | | | | | |
|---|---|---|---|---|---|
| CN | 112378785 | A | * | 2/2021 | ............. G01N 3/303 |
| CN | 216013019 | U | * | 3/2022 | |
| CN | 216116646 | U | | 3/2022 | |
| DE | 19859635 | C1 | * | 9/2000 | ............. G01N 3/303 |
| JP | H09-54029 | A | | 2/1997 | |
| JP | 2018-041726 | A | | 3/2018 | |
| KR | 10-2011-0109177 | A | | 10/2011 | |
| KR | 10-2014-0000398 | A | | 1/2014 | |
| KR | 2017-0105415 | A | | 9/2017 | |
| KR | 10-2017-0123134 | A | | 11/2017 | |
| KR | 20170123134 | A | * | 11/2017 | .............. G01M 7/08 |
| KR | 10-2018-0037886 | A | | 4/2018 | |
| KR | 10-2132980 | B1 | | 7/2020 | |

OTHER PUBLICATIONS

Machine translation of CN 104132794 (Year: 2014).*
Machine translation of CN 107340178 (Year: 2019).*
Machine translation of CN 112378785 (Year: 2021).*
Machine translation of CN 209181991 (Year: 2019).*
Machine translation of CN 216013019 (Year: 2022).*
Machine translation of DE 19859635 (Year: 1998).*
Machine translation of KR 20170123134 (Year: 2017).*

* cited by examiner

CYLINDRICAL BATTERY CELL IMPACT TEST METHODS AND CYLINDRICAL BATTERY CELL IMPACT TEST APPARATUSES THEREFOR

CROSS-REFERENCE TO RELATED APPLICATIONS

This application is a National Phase entry pursuant to 35 U.S.C. § 371 of International Application No. PCT/KR2023/017225 filed on Nov. 1, 2023, which claims priority to and the benefit of Korean Patent Application No. 10-2022-0144009, filed on Nov. 1, 2022. The contents of the above-identified applications are herein incorporated by reference in their entireties.

TECHNICAL FIELD

The present disclosure relates to cylindrical battery cell impact test methods and cylindrical battery cell impact test apparatuses therefor. More particularly, the present disclosure relates to impact test methods of applying a predetermined level of impact to a side surface of a cylindrical battery cell to check whether a battery can explode and impact test apparatuses therefor.

BACKGROUND

Depending on the shape of a battery case, lithium secondary batteries may be classified as a cylindrical battery cell having an electrode assembly mounted in a cylindrical metal can, a prismatic battery cell having an electrode assembly mounted in a prismatic metal can, or a pouch-shaped battery cell having an electrode assembly mounted in a pouch-shaped case made of an aluminum laminate sheet. The cylindrical battery cell has the advantages of relative large capacity and structural safety.

A lithium secondary battery may explode under strong external impact. In addition, a case may be physically broken and opened by external impact, or short circuit may occur in a battery due to impact, and the battery may overheat and gas may be generated in the battery as the result of short circuit. Since the lithium secondary battery is a device configured to store energy at high density, various tests are required to prevent safety-related accidents. An impact test, in which a heavy object is dropped, is the most representative of these tests.

An impact test is a test that may comply with UL Standard 1642 and/or 2054. An impact test may be performed by disposing a metal rod having a diameter of 15.8 mm on a side surface of a cylindrical battery cell so as to be perpendicular to the central axis of the cylindrical battery cell, dropping a weight of 9.1 kg (about 20 pounds) from a height of 610±25 mm from the battery cell onto an upper surface of the metal rod, and observing the state of the cylindrical battery cell.

An impact test may be performed on five samples, and a product may be determined to be suitable only when all five samples do not burst. Therefore, the same level of impact should be applied to all five samples in order to increase a possibility that the product is determined to be good.

"Not burst" means that a case of the cylindrical battery cell must not open. For example, a cap assembly must not be separated from the battery cell, and a side surface of a battery case must not be torn. "Burst" includes both that the case is opened by simple physical impact and/or that an electrode assembly is broken by physical impact and the case of the battery cell is secondarily opened as the result of the breakage.

Conventionally, an impact test may be performed by disposing a metal rod on a side surface of a cylindrical battery cell and dropping a weight onto the metal rod. Since the side surface of the battery cell is curved, one end of the metal rod is in contact with a base, a central part of the metal rod is in contact with the side surface of the battery cell, and the other end of the metal rod is inclined upward. As a result, the position of the metal rod on the side surface of the cylindrical battery cell may vary, and the degree of inclination of the metal rod may vary, resulting in the problem that the same level of impact is not applied to battery cells.

When the weight drops onto the inclined metal rod, a relatively high part of the metal rod primarily comes into contact with the weight, whereby impact is transferred to the relatively high part of the metal rod. A relatively low part of the metal rod is subjected to the repulsive force of the weight raised by the impact due to the primary contact. In this case, not all of the impact of the weight may be transferred to the cylindrical battery cell. Furthermore, it may be difficult to keep the level of the impact applied to the cylindrical battery cell constant.

Therefore, there is a need for impact test methods and impact test apparatuses capable of improving accuracy and reliability of the impact test.

Patent Document 1 discloses a battery cell impact test apparatus configured such that, when a second driving portion is lowered toward the top of a cylindrical battery cell, an impact portion provided under the second driving portion presses one side of the battery cell.

In Patent Document 1, a method of calculating the distance from the second driving portion to the bottom of a chamber in which the cylindrical battery cell is disposed using a laser sensor is used, and the height of the second driving portion is adjusted based on the distance measurement result of the laser sensor. Consequently, it is possible to repeatedly press one side of the cylindrical battery cell, and therefore it is possible to improve precision and reliability of experiments.

Patent Document 1 discloses a method of applying uniform impact to a cap assembly of the cylindrical battery cell when the impact test is performed, but does not disclose a method of uniformly applying impact to a side surface of the cylindrical battery cell.

Patent Document 2 discloses a method different from UL Standard 1642 and/or 2054, wherein an impact test is performed using two shafts and a round rod configured to be driven upward and downward along the shafts. Each shaft may be provided with a recessed rail. In Patent Document 2, the round rod is dropped, which is different from the international standard method, and the impact amount is reduced or changed by the friction force of the round rod moving along the shafts.

Therefore, there is a need for methods and apparatuses capable of, when performing an impact test to check for bursting by applying impact to a side surface of a cylindrical battery cell according to international standards, preventing deviation of a metal rod due to a weight and improving reliability of the impact test by applying the same level of impact even though the test is repeated several times.

(Patent Document 1) Korean Patent Application Publication No. 2014-0000398 (2014.01.03)

(Patent Document 2) Korean Registered Patent Publication No. 2132980 (2020.07.06)

The background description provided herein is for the purpose of generally presenting context of the disclosure. Unless otherwise indicated herein, the materials described in this section are not prior art to the claims in this application and are not admitted to be prior art, or suggestions of the prior art, by inclusion in this section.

SUMMARY

The present disclosure has been made in view of the above problems, and it is an object of the present disclosure to provide cylindrical battery cell impact test methods configured such that, during an impact test in which impact is applied to a side surface of a cylindrical battery cell, the contact state between a metal rod and the cylindrical battery cell is maintained, whereby the impact of a weight is directly transferred to the cylindrical battery cell, and cylindrical battery cell impact test apparatuses therefore.

A cylindrical battery cell impact test method according to the present disclosure to accomplish the above objects may include disposing a cylindrical battery cell on a base; disposing a magnetic portion of a rod above a surface of the cylindrical battery cell; and dropping a weight toward the rod.

A first end of the rod may be coupled to a first guide and a second end of the rod may be coupled to a second guide.

A central axis of the rod may be disposed orthogonally to a central axis of the cylindrical battery cell.

The magnetic portion of the rod may be on an outer surface of a central portion of the rod.

The cylindrical battery cell impact test method may further include adjusting a first position of the first guide or adjusting a second position of the second guide such that a first distance extending between the first end of the rod and the base and a second distance extending between the second end of the rod and the base are uniform.

The first end of the rod may include a first guide movement portion and the second end of the rod may include a second guide movement portion; and the first guide movement portion may move vertically along a first interior of the first guide and the second guide movement portion may move vertically along a second interior of the second guide.

The magnetic portion of the rod and the surface of the cylindrical battery cell may remain in contact after the weight is dropped toward the rod.

A cylindrical battery cell impact test apparatus may include a base configured for placement of a cylindrical battery cell on a surface thereof for an impact test; a rod including a magnetic portion for contacting the cylindrical battery cell placeable on the surface of the base; and a weight for dropping toward the rod.

The cylindrical battery cell impact test apparatus may further include a first guide mounted to a first end of the rod and a second guide mounted to a second end of the rod, the first guide configured to adjust a first height of the first end of the rod and the second guide configured to adjust a second height of the second end of the rod.

The first guide may include a first scale for measuring the first height and the second guide may include a second scale for measuring the second height.

The first end of the rod may include a first guide movement portion and the second end of the rod may include a second guide movement portion; and the first guide movement portion may be configured to move vertically along a first interior of the first guide and the second guide movement portion may be configured to move vertically along a second interior of the second guide.

The first guide may include a first bolt disposed above the rod for adjusting the first height; and the second guide may include a second bolt disposed above the rod for adjusting the second height.

The first guide may include a first elastic member disposed above the rod and a first adjustment portion provided at a first upper part of the first elastic member, the first adjustment portion configured to adjust a first length of the first elastic member; and the second guide may include a second elastic member disposed above the rod and a second adjustment portion provided at a second upper part of the second elastic member, the second adjustment portion configured to adjust a second length of the second elastic member, wherein adjusting the first length of the first elastic member adjusts the first height and adjusting the second length of the second elastic member adjusts the second height.

The rod may include a level.

The rod may be cylinder-shaped or a polygonal column.

The magnetic portion may be a permanent magnet added to an outer surface of the rod or an electromagnet added to an outer surface of the rod.

The base may include a cylindrical battery cell mounting portion.

In addition, the present disclosure may provide various combinations of the above techniques.

As is apparent from the above description, according to the present disclosure, the contact state between a cylindrical battery cell and a metal rod may be maintained even though a weight is dropped onto the metal rod, whereby the amount of impact of the weight applied to the metal rod may be transferred to the cylindrical battery cell without being dissipated.

In addition, since the weight is dropped in the state in which the metal rod is disposed above a side surface of the cylindrical battery cell so as to be parallel to a base, the level of the impact applied to the cylindrical battery cell may be maintained uniform over repeated experiments.

Technical objects to be achieved by the present disclosure are not limited to the technical objects mentioned herein, and other technical objects not mentioned will be clearly understood by those skilled in the art from the description below.

BRIEF DESCRIPTION OF THE DRAWINGS

The accompanying drawings illustrate various embodiments of the present disclosure and together with the foregoing disclosure, serve to provide further understanding of the technical features of the present disclosure, and thus, the present disclosure is not construed as being limited to the drawings.

DETAILED DESCRIPTION

Figure 1:
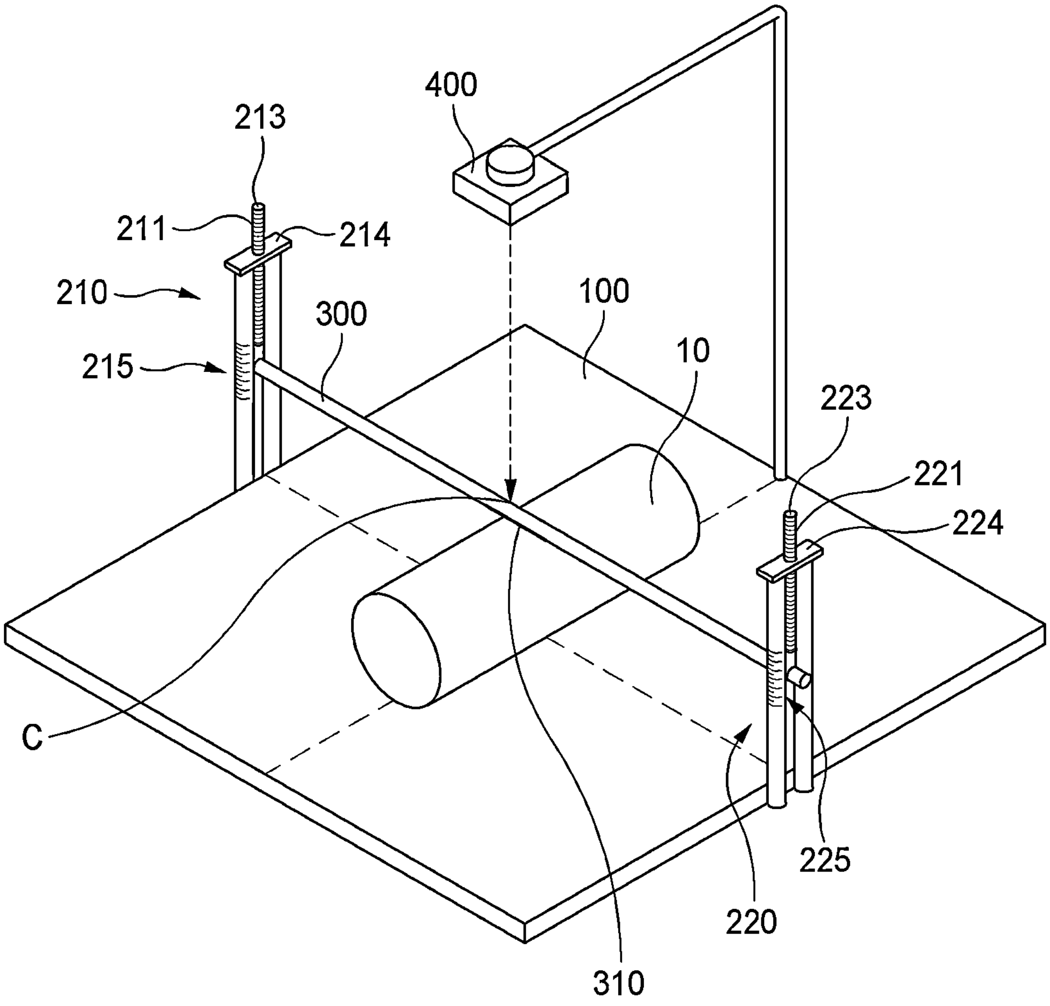
FIG. 1 is a perspective view of a cylindrical battery cell impact test apparatus according to a first embodiment of the present disclosure.

Now, various embodiments of the present disclosure will be described in detail with reference to the accompanying drawings such that various embodiments of the present disclosure can be easily implemented by a person having ordinary skill in the art to which the present disclosure pertains. In describing the principle of operation of the various embodiments of the present disclosure in detail, however, a detailed description of known functions and configurations incorporated herein will be omitted when the same may obscure the subject matter of the present disclosure.

In addition, the same reference numbers will be used throughout the drawings to refer to parts that perform similar functions or operations. In the case in which one part is said to be connected to another part throughout the specification, not only may the one part be directly connected to the other part, but also, the one part may be indirectly connected to the other part via a further part. In addition, that a certain element is included does not mean that other elements are excluded, but means that such elements may be further included unless mentioned otherwise.

In addition, a description to embody elements through limitation or addition may be applied to all embodiments, unless particularly restricted, and does not limit a specific embodiment.

Also, in the description and the claims of the present application, singular forms are intended to include plural forms unless mentioned otherwise.

Also, in the description and the claims of the present application, "or" includes "and" unless mentioned otherwise. Therefore, "including A or B" means three cases, namely, the case including A, the case including B, and the case including A and B.

Embodiments of the present disclosure will be described in detail with reference to the drawings.

In embodiments of the present disclosure, a metal rod, a weight, and the drop height of the weight may be a metal rod having a diameter of 15.8 mm, a weight of 9.1 kg (about 20 pounds), and a height of 610±25 mm from a battery cell, which comply with international standards.

An 18650 cylindrical battery, which has a diameter of 18 mm, may be formed in a cylindrical shape having a diameter similar to the diameter of the metal rod, which is 15.8 mm. In FIGS. 1 to 9, however, a cylindrical battery cell, a metal rod, and a weight are partially diminished or exaggerated, not in proportion to the actual sizes. The width, depth, and height of the weight may be about 100 mm, 100 mm, and 100 mm, respectively. In such cases, therefore, the volume of the weight is greater than the volume of the 18650 cylindrical battery.

In addition, a part configured to fix the weight shown in FIGS. 1 to 9 may be any device capable of dropping the weight from a predetermined height as an example. For example, various variations, such as fixing the weight using a hook and then dropping the weight, placing the weight on a fixture and then pushing the weight downward, and fixing the weight using an electromagnet and then dropping the weight, are possible.

Figure 2:
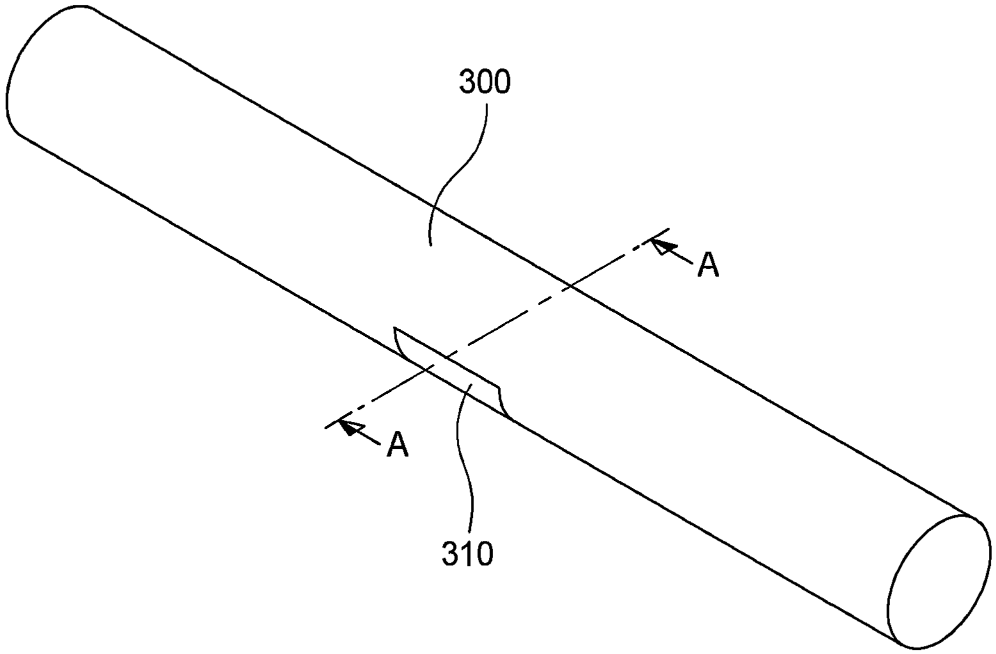
FIG. 2 is an enlarged perspective view of a metal rod in FIG. 1.
Figure 3:
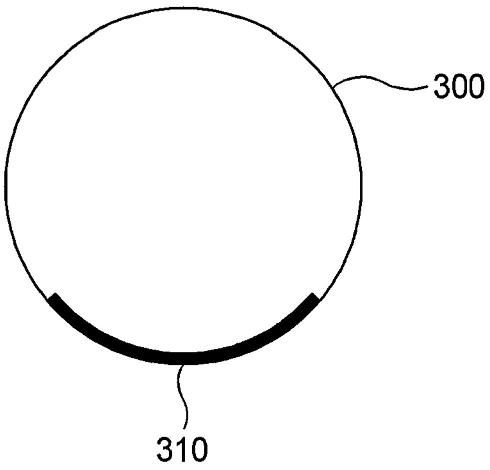
FIG. 3 is a vertical sectional view taken along A-A of FIG. 2.

FIG. 1 is a perspective view of a cylindrical battery cell impact test apparatus according to a first embodiment of the present disclosure, FIG. 2 is an enlarged perspective view of a metal rod in FIG. 1, and FIG. 3 is a vertical sectional view taken along A-A of FIG. 2.

Referring to FIGS. 1 to 3, the cylindrical battery cell impact test apparatus according to the present disclosure includes a base 100 configured to allow a cylindrical battery cell 10 to be disposed on an upper surface thereof, a metal rod 300 disposed above a side surface of the cylindrical battery cell 10, a first guide 210 and a second guide 220 mounted respectively to opposite ends of the metal rod 300, each of the first guide and the second guide being configured to adjust the height of the metal rod 300, and a weight 400 configured to drop toward the metal rod 300.

The metal rod 300 is disposed at the side surface of the cylindrical battery cell 10 in the state in which opposite ends of the metal rod are mounted to the first guide 210 and the second guide 220, respectively, and is disposed such that the central axis of the metal rod 300 and the central axis of the cylindrical battery cell 10 are orthogonal to each other.

A simpler form than the first embodiment of the present disclosure is also possible in which the first guide 210 and the second guide 220 are omitted. In this case, in the same manner as in a conventional method, one end of the metal rod 300 may be in contact with the base 100, a central part of the metal rod may be in contact with the side surface of the cylindrical battery cell 10, which is curved, and the other end of the metal rod may be inclined upward. When a magnetic portion 310 of the metal rod 300 is strong, as described below, the metal rod 300 may be maintained in a horizontal state even though the first guide 210 and the second guide 220 are omitted.

The present disclosure relates to impact test methods of determining whether the cylindrical battery cell 10 bursts when the weight 400 is dropped toward the interface between the cylindrical battery cell 10 and the metal rod 300 in the state in which the cylindrical battery cell 10 is disposed such that the side surface of the cylindrical battery cell rests on the base 100 and the metal rod 300 is disposed on the side surface of the cylindrical battery cell 10 or above the side surface of the cylindrical battery cell. When the cylindrical battery cell 10 bursts, the cylindrical battery cell is determined to be a defective battery cell, and when the cylindrical battery cell 10 does not burst, the cylindrical battery cell is determined to be a normal battery cell.

Preferably, the metal rod 300 remains in contact with the side surface of the cylindrical battery cell 10 such that, when the weight 400 and the metal rod 300 collide with each other, bouncing up of the metal rod 300 is prevented or movement of the weight 400 in contact with the cylindrical battery cell 10 is prevented, whereby the magnitude of the gravitational impact of the weight 400 is directly transferred to the cylindrical battery cell 10.

In the present disclosure, therefore, a magnetic portion 310 may be added to at least a part of an outer surface of the metal rod 300 such that contact between the metal rod 300 and the cylindrical battery cell 10 can be maintained by magnetic force.

For example, the magnetic portion 310 may be added to the entirety of the outer surface of the metal rod 300, or the magnetic portion 310 may be formed on an outer surface of a part of a central part of the metal rod 300 in a longitudinal direction.

In the structure in which the magnetic portion 310 is added to the entirety of the outer surface of the metal rod 300, it is not necessary to consider the position of the magnetic portion 310 formed on the metal rod 300 when the metal rod 300 is disposed on the side surface of the cylindrical battery cell 10. Even though the metal rod 300 attached to the outer surface of the cylindrical battery cell 10 is inclined or even though the part of the metal rod 300 in contact with the cylindrical battery cell 10 deviates from the center of the metal rod 300, contact between the metal rod 300 and the cylindrical battery cell 10 may be maintained during the impact test.

In the structure in which the magnetic portion 310 is added to an outer surface of a part of the central part of the metal rod 300 in the longitudinal direction, when a contact surface is formed between the maximum protrusion of the side surface of the cylindrical battery cell and the magnetic portion 310 in the state in which the cylindrical battery cell 10 is disposed such that the side surface of the cylindrical battery cell rests on the base 100, equilibrium of the metal rod 300 may be maintained based on the contact surface, and the distances from the opposite ends of the metal rod 300 to the base 100 may be uniform. In addition, when the magnetic portion 310 is sufficiently strong, the metal rod 300 may be maintained in a horizontal state even though the first guide 210 and the second guide 220 are omitted. Even though the impact test is performed on a plurality of samples while changing the cylindrical battery cell 10, therefore, the magnitude of impact applied to the metal rod 300 may be maintained uniform.

In the structure in which the magnetic portion 310 is added to a part of the outer surface of the metal rod 300, no step or groove need be formed at the boundary between the surface of the magnetic portion 310 and the surface of the metal rod 300 surrounding the magnetic portion 310, and in the section of the metal rod 300 as shown in FIG. 3, the diameter of the metal rod 300 at the part where the magnetic portion 310 is present is the same as the diameter of the metal rod 300 at the part where the magnetic portion 310 is absent.

For example, the magnetic portion 310 may be configured as a permanent magnet or an electromagnet added to the outer surface of the metal rod.

The metal rod is shown as having the shape of a cylinder in FIGS. 1 to 3; however, the shape of the metal rod described in the present disclosure is not limited to a cylindrical shape, and the metal rod may also be formed in the shape of a polygonal column.

As shown by dotted lines in FIG. 1, a longitudinal central axis and a transverse central axis may be marked on the base 100, and the positions of the weight 400 and the cylindrical battery cell 10 may be adjusted such that the drop point of the weight 400 and the part of the cylindrical battery cell 10 to which impact is applied lie at the intersection C of the longitudinal central axis and the transverse central axis.

Opposite ends of the metal rod 300 may be mounted to the first guide 210 and the second guide 220, respectively, and when the metal rod 300 is disposed such that the center of the metal rod 300 lies on the side surface of the cylindrical battery cell 10 disposed on the base 100 and the opposite ends of the metal rod 300 are pressed with uniform force from top to bottom, the metal rod 300 and the base 100 may be parallel to each other. In this way, the first guide 210 and the second guide 220 may adjust the positions of the opposite ends of the metal rod 300 such that that the distances from the opposite ends of the metal rod 300 to the base 100 are uniform.

A first scale 215 is formed on a side surface of the first guide 210 and a second scale 225 is formed on a side surface of the second guide 220 such that the height of the metal rod 300 from the base 100 can be visually checked.

In a first embodiment, the first guide 210 and the second guide 220 respectively include a first vertical adjustment portion and a second vertical adjustment portion each configured to adjust the height of the metal rod 300.

The first vertical adjustment portion is configured such that a first long bolt 211 is disposed so as to extend through an upper end 214 of the first guide and a lower end of the first long bolt 211 is in contact with the metal rod 300. The height of the first long bolt 211 may be adjusted using a screwdriver or a wrench that fits into a screw head or a recess formed at an upper end 213 of the first long bolt 211 in order to level the metal rod 300. The second vertical adjustment portion is configured such that a second long bolt 221 is disposed so as to extend through an upper end 224 of the second guide and a lower end of the second long bolt 221 is in contact with the metal rod 300. The height of the second long bolt 221 may be adjusted using a screwdriver or a wrench that fits into a screw head or a recess formed at an upper end 223 of the second long bolt 221 in order to level the metal rod 300.

In this way, the metal rod 300 may be brought into a state parallel to the base 100 by the first long bolt 211 and the second long bolt 221. When the weight 400 is dropped at this time, it is possible to prevent the metal rod 300 from tilting or bouncing up, and the amount of impact of the weight 400 applied to the metal rod 300 may be transferred to the cylindrical battery cell 10 without being dissipated.

Figure 4:
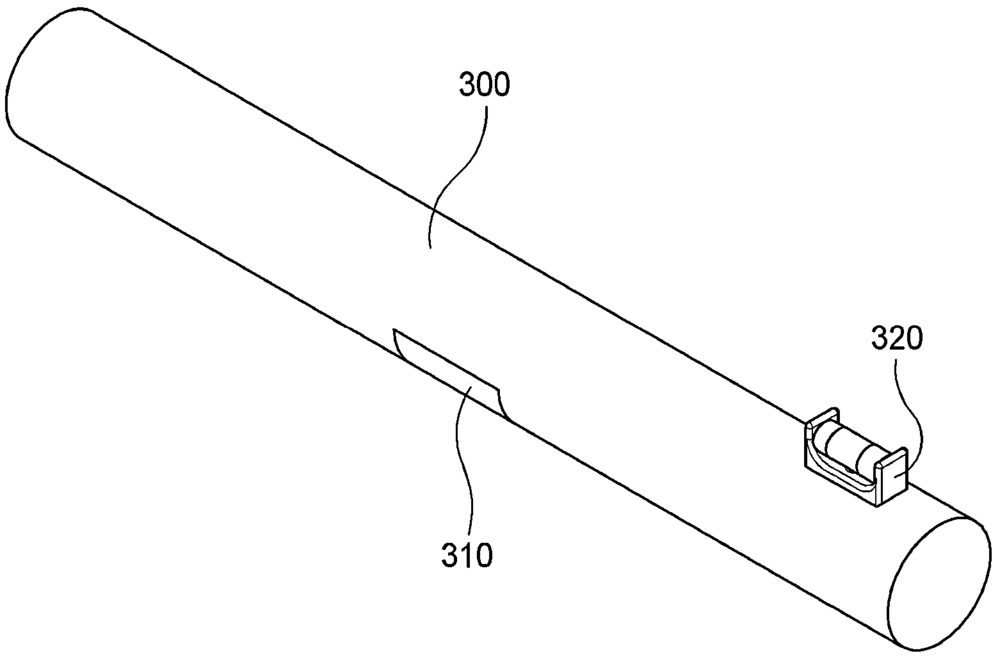
FIG. 4 is a perspective view showing the state in which a level is added to the metal rod in FIG. 2.

FIG. 4 is a perspective view showing the state in which a level is added to the metal rod 300 in FIG. 2.

Referring to FIG. 4, a level 320 is disposed on the outer surface of the metal rod 300. In a cylindrical battery cell impact test apparatus according to the present disclosure, since the first scale 415 and the second scale 425 may be marked on the first guide and the second guide, respectively, the heights of opposite ends of the metal rod may be set to be the same. When level 320 is further added as shown in FIG. 4, however, the metal rod may be leveled using the level 320.

Figure 5:
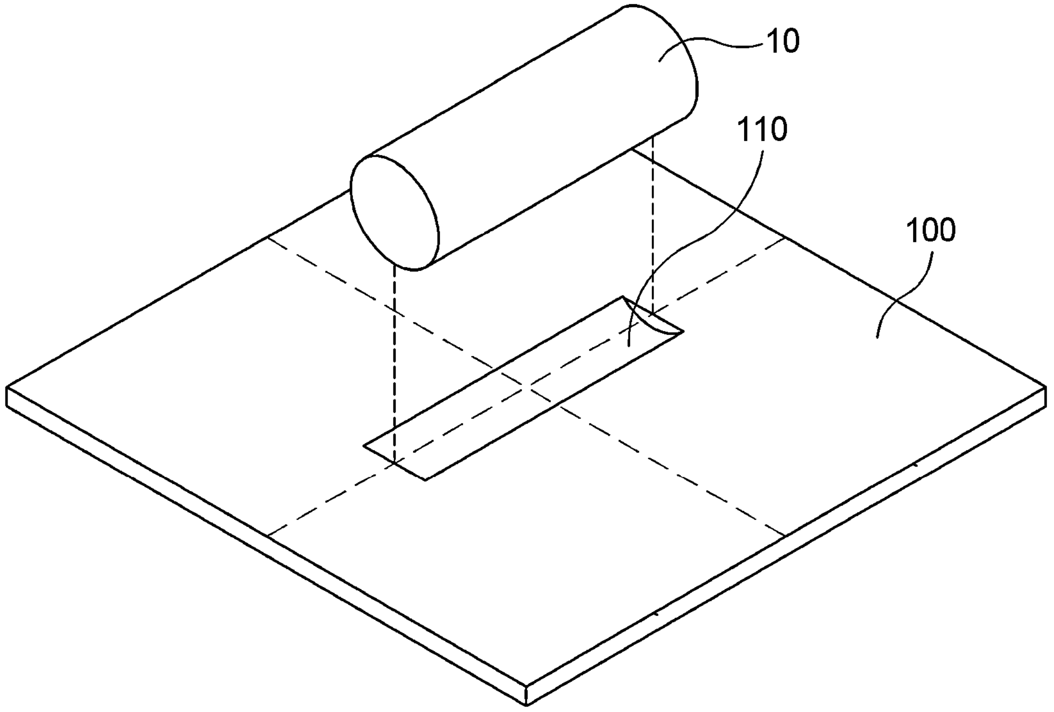
FIG. 5 is a perspective view of a base having a cylindrical battery cell mounting portion formed therein.

FIG. 5 is a perspective view of a base having a cylindrical battery cell mounting portion formed therein.

Referring to FIG. 5, the base 100 may include a mounting portion 110 having a recess corresponding to the outer surface of the cylindrical battery cell 10 so as to receive a lower part of the cylindrical battery cell 10.

When the impact test is performed by dropping the weight in the state in which at least a part of the lower part of the cylindrical battery cell 10 is received in the mounting portion 110, it is possible to prevent the cylindrical battery cell 10 from bouncing up due to the impact of the weight. However, results that differ from international standards may be obtained depending on whether or not the mounting portion 110 is provided, and the mounting portion 110 may be further added as long as statistically consistent results are observed.

Figure 6:
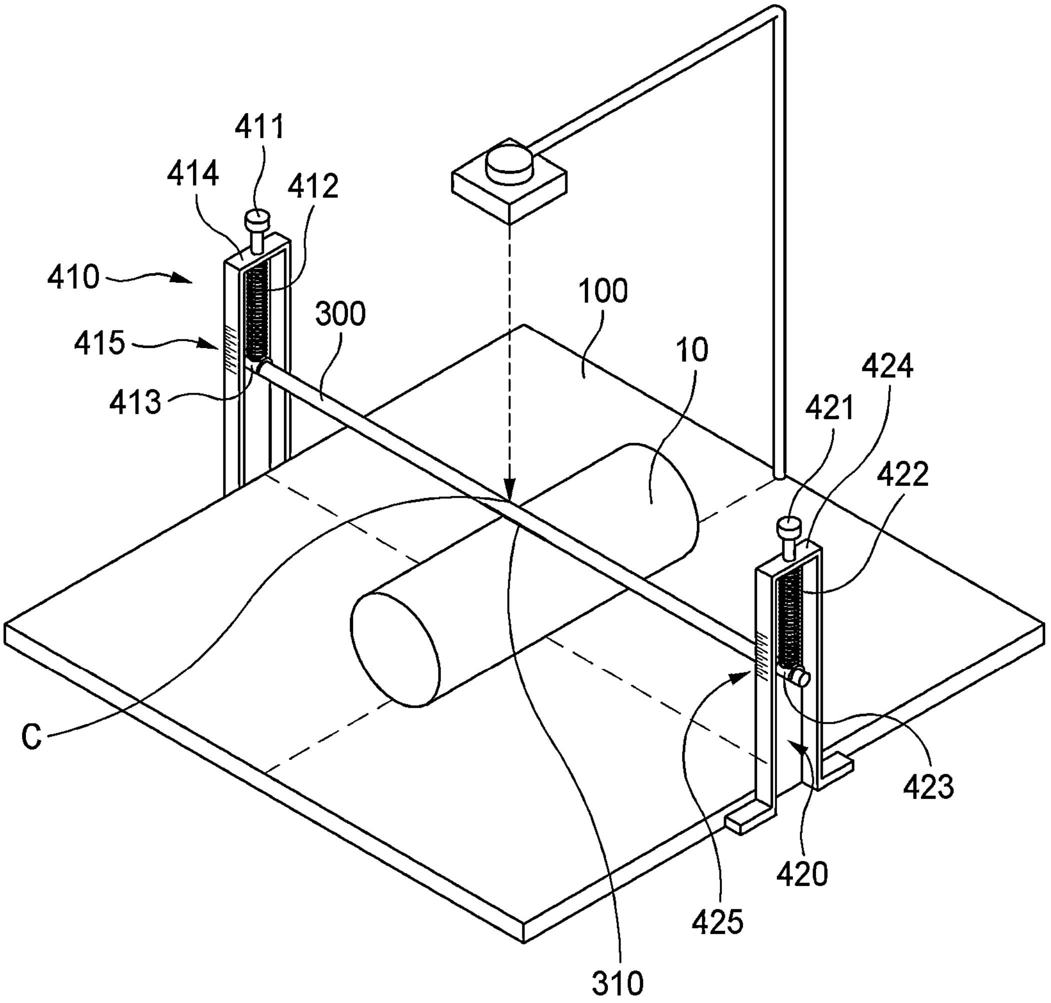
FIG. 6 is a perspective view of a cylindrical battery cell impact test apparatus according to a second embodiment of the present disclosure.

FIG. 6 is a perspective view of a cylindrical battery cell impact test apparatus according to a second embodiment of the present disclosure.

Referring to FIG. 6, in the cylindrical battery cell impact test apparatus according to a second embodiment, a first guide 410 and a second guide 420 respectively include a first vertical adjustment portion and a second vertical adjustment portion configured to adjust the height of a metal rod 300.

The first vertical adjustment portion includes a first elastic member 412 disposed above the metal rod 300 and a first adjustment portion 411 coupled to an upper part 414 of the first elastic member to adjust the length of the first elastic member 412. In addition, a first gripper 413 formed in a semi-cylindrical shape so as to cover a part of an outer surface of the metal rod 300, which has a cylindrical structure, is coupled to a lower part of the first elastic member 412. When the metal rod 300 is formed in the shape of a polygonal column, the shape of the first gripper 413 may be configured to correspond to the shape of the polygonal column so as to cover a part of the outer surface of the polygonal column in tight contact. When the first gripper 413 having the above configuration is provided, it is possible to effectively press the metal rod 300 irrespective of the shape of the metal rod 300.

The second vertical adjustment portion includes a second elastic member 422 disposed above the metal rod 300 and a second adjustment portion 421 coupled to an upper part 424 of the second elastic member to adjust the length of the second elastic member 422. In addition, a second gripper 423 formed in a semi-cylindrical shape so as to cover a part of the outer surface of the metal rod 300, which has a cylindrical structure, is coupled to a lower part of the second elastic member 422.

Each of the first elastic member 412 and the second elastic member 422 may be, for example, a spring, and the first adjustment portion 411 and the second adjustment portion 421 may press the first elastic member 412 and the second elastic member 422, respectively, such that the metal rod 300 is in tight contact with the first gripper 413 and the second gripper 423 and such that the metal rod 300 and the cylindrical battery cell 10 are in tight contact with each other.

A description of the first gripper 413 is equally applicable to the second gripper 423 of the second vertical adjustment portion.

Figure 7:
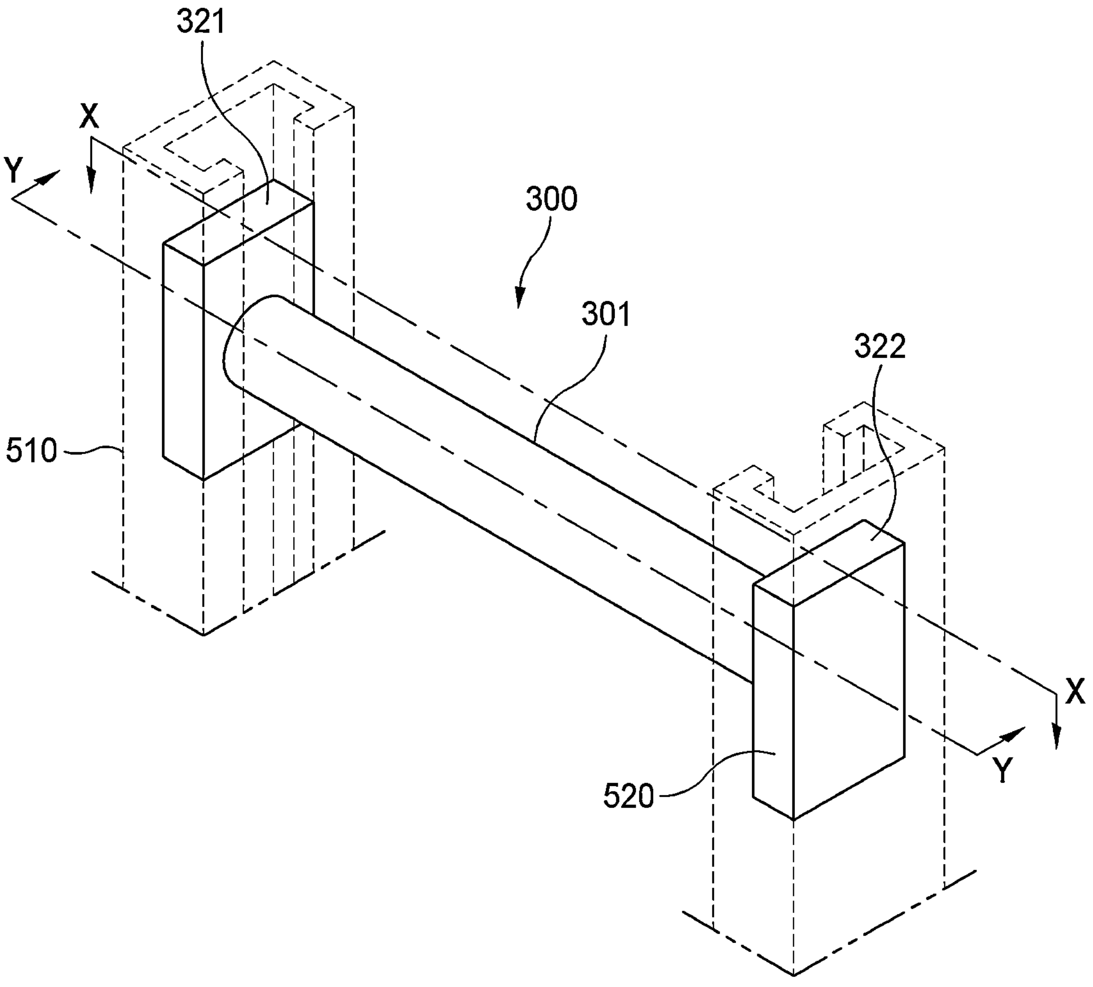
FIG. 7 is a perspective view of a metal rod according to a third embodiment of the present disclosure.
Figure 8:
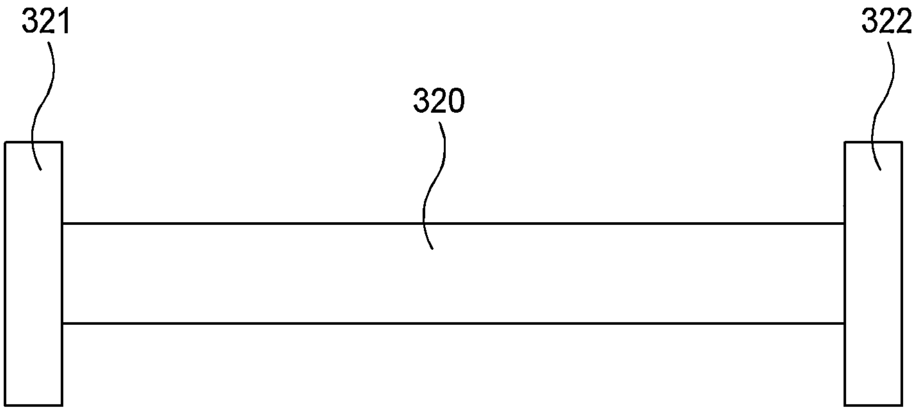
FIG. 8 is a vertical sectional view of the metal rod, taken along X-X of FIG. 7.
Figure 9:
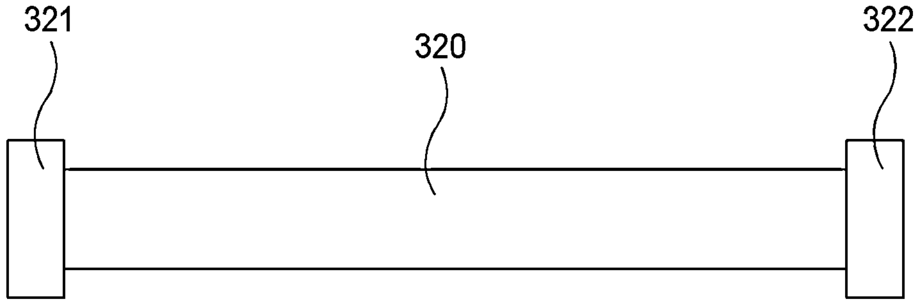
FIG. 9 is a vertical sectional view of the metal rod, taken along Y-Y of FIG. 7.

FIG. 7 is a perspective view of a metal rod according to a third embodiment of the present disclosure, FIG. 8 is a vertical sectional view of the metal rod, taken along X-X of FIG. 7, and FIG. 9 is a vertical sectional view of the metal rod, taken along Y-Y of FIG. 7.

Referring to FIGS. 7 to 9, the metal rod 300 according to a third embodiment includes a metal rod body 301 and a first guide movement portion 321 and a second guide movement portion 322 coupled respectively to opposite ends of the metal rod body 301.

The first guide movement portion 321 may be disposed in a space defined in a first guide 510 so as to be movable in the space in a vertical direction, and the second guide movement portion 322 may be disposed in a space defined in a second guide 520 so as to be movable in the space in the vertical direction.

Since the metal rod 300 according to the third embodiment includes the first guide movement portion 321 and the second guide movement portion 322, which move vertically along the spaces defined in the first guide 510 and the second guide 520, respectively, in a direction perpendicular to the base, the metal rod 300 may move vertically in a state of being parallel to the base.

In addition, although not shown in FIG. 7, a vertical movement portion shown in FIGS. 1 and 6 may be applied as a means configured to move each of the first guide movement portion 321 and the second guide movement portion 322 in the vertical direction.

In addition, although not shown in FIG. 7, a magnetic portion may be formed at the entirety of an outer surface of a metal rod body 301, or may be added only to a lower surface of a central part of the metal rod body 301.

Each of the first guide movement portion 321 and the second guide movement portion 322 includes a flat upper surface. When a long bolt is used as an elastic member, therefore, a contact surface in contact with a lower surface of the long bolt may be formed as a plane parallel to the base. Consequently, it is possible to press the entirety of the contact surface with uniform force, and therefore the metal rod may be stably and effectively pressed.

When the present disclosure is used, as described above, the contact state between the metal rod and the cylindrical battery cell may be stably maintained, whereby the contact state between the magnetic portion of the metal rod and the side surface of the cylindrical battery cell may be maintained throughout the entire process of the step in which the weight is dropped onto the metal rod, and therefore it is possible to prevent the conventional problem that the force of the weight is not completely transferred to the cylindrical battery cell due to the bouncing up of the metal rod when the weight presses the metal rod.

In addition, since the weight is dropped while the metal rod is disposed in a horizontal state, the magnitude of the impact applied to the cylindrical battery cell may be kept uniform as long as the load and position of the weight are kept constant, whereby it is possible to improve reliability of the impact test. As such, the cylindrical battery cell impact test methods according to the present disclosure and the cylindrical battery cell impact test apparatuses therefor provide consistent results compared to the prior art.

Those skilled in the art to which the present disclosure pertains will appreciate that various applications and modifications are possible within the category of the present disclosure based on the above description.

DESCRIPTION OF REFERENCE SYMBOLS

10: Cylindrical battery cell
100: Base
110: Mounting portion
210, 410, 510: First guides
211: First long bolt
213: Upper end of first long bolt
214: Upper end of first guide
215, 415: First scale
220, 420, 520: Second guides
221: Second long bolt
223: Upper end of second long bolt
224: Upper end of second guide
225, 425: Second scale
300: Metal rod
301: Metal rod body
310: Magnetic portion
320: Level
321: First guide movement portion
322: Second guide movement portion
400: Weight
411: First adjustment portion
412: First elastic member
413: First gripper
414: Upper part of first elastic member
421: Second adjustment portion
422: Second elastic member
423: Second gripper
424: Upper part of second elastic member
C: Intersection

The invention claimed is:

1. A cylindrical battery cell impact test method comprising:

disposing a cylindrical battery cell on a base;

disposing a magnetic portion of a rod above a surface of the cylindrical battery cell; and dropping a weight toward the rod.

2. The cylindrical battery cell impact test method according to claim 1, wherein a first end of the rod is coupled to a first guide and a second end of the rod is coupled to a second guide.

3. The cylindrical battery cell impact test method according to claim 2, further comprising adjusting a first position of the first guide or adjusting a second position of the second guide such that a first distance extending between the first end of the rod and the base and a second distance extending between the second end of the rod and the base are the same.

4. The cylindrical battery cell impact test method according to claim 2, wherein:

the first end of the rod includes a first guide movement portion and the second end of the rod includes a second guide movement portion; and the first guide movement portion moves vertically along a first interior of the first guide and the second guide movement portion moves vertically along a second interior of the second guide.

5. The cylindrical battery cell impact test method according to claim 1, wherein a central axis of the rod is disposed orthogonally to a central axis of the cylindrical battery cell.

6. The cylindrical battery cell impact test method according to claim 1, wherein the magnetic portion of the rod is on an outer surface of a central portion of the rod.

7. A cylindrical battery cell impact test apparatus, the cylindrical battery cell impact test apparatus comprising:

a base configured for placement of a cylindrical battery cell on a surface thereof for an impact test;

a rod including a magnetic portion for contacting the cylindrical battery cell when the rod is placed on the cylindrical battery cell; and a weight for dropping toward the rod.

8. The cylindrical battery cell impact test apparatus according to claim 7, further comprising a first guide mounted to a first end of the rod and a second guide mounted to a second end of the rod, the first guide configured to adjust a first height of the first end of the rod and the second guide configured to adjust a second height of the second end of the rod.

9. The cylindrical battery cell impact test apparatus according to claim 8, wherein the first guide includes a first scale for measuring the first height and the second guide includes a second scale for measuring the second height.

10. The cylindrical battery cell impact test apparatus according to claim 8, wherein:

the first end of the rod includes a first guide movement portion and the second end of the rod includes a second guide movement portion; and the first guide movement portion is configured to move vertically along a first interior of the first guide and the second guide movement portion is configured to move vertically along a second interior of the second guide.

11. The cylindrical battery cell impact test apparatus according to claim 8, wherein:

the first guide includes a first bolt disposed above the rod for adjusting the first height; and the second guide includes a second bolt disposed above the rod for adjusting the second height.

12. The cylindrical battery cell impact test apparatus according to claim 8, wherein the first guide includes a first elastic member disposed above the rod and a first adjustment portion provided at a first upper part of the first elastic member, the first adjustment portion configured to adjust a first length of the first elastic member; and the second guide includes a second elastic member disposed above the rod and a second adjustment portion provided at a second upper part of the second elastic member, the second adjustment portion configured to adjust a second length of the second elastic member, wherein adjusting the first length of the first elastic member adjusts the first height and adjusting the second length of the second elastic member adjusts the second height.

13. The cylindrical battery cell impact test apparatus according to claim 7, wherein the rod includes a level.

14. The cylindrical battery cell impact test apparatus according to claim 7, wherein the rod is cylinder-shaped or a polygonal column.

15. The cylindrical battery cell impact test apparatus according to claim 7, wherein the magnetic portion is a permanent magnet added to an outer surface of the rod or an electromagnet added to an outer surface of the rod.

16. The cylindrical battery cell impact test apparatus according to claim 7, wherein the base comprises a cylindrical battery cell mounting portion.

* * * * *